Oct. 18, 1966 H. G. GRIMMEISS ETAL 3,279,962

METHOD OF MANUFACTURING SEMI-CONDUCTOR DEVICES
USING CADMIUM SULPHIDE SEMI-CONDUCTORS

Filed March 22, 1963

INVENTORS
HERMANN G. GRIMMEISS
RÜDIGER MEMMING
BY
Frank R. Jeffrey
AGENT

United States Patent Office 3,279,962

Patented Oct. 18, 1966

3,279,962

METHOD OF MANUFACTURING SEMI-CONDUCTOR DEVICES USING CADMIUM SULPHIDE SEMI-CONDUCTORS

Hermann George Grimmeiss, Aachen, and Rudiger Memming, Egenbuttel, near Hamburg, Germany, assignors to North American Philips Company, Inc., New York, N.Y., a corporation of Delaware Filed Mar. 22, 1963, Ser. No. 267,099
Claims priority, application Germany, Apr. 3, 1962, N 21,414
5 Claims. (Cl. 148—186)

This invention relates to a method of manufacturing a semi-conductor device, for example, a barrier layer photocell, with the use of a semi-conductor consisting of cadmium sulphide, in which method on the surface of a body or a layer of n-type cadmium sulphide an acceptor impurity is diffused into a zone of the body or layer of cadmium sulphide which adjoins the surface. In a known method of this kind, a thin zone is produced in this manner which is doped with copper as the acceptor, a barrier layer being formed between this zone and the adjoining n-type material. By irradiation of the region of this barrier layer, a photovoltage can be produced across the barrier layer and barrier-layer photocells can be manufactured by said method.

The photo-effects, especially the photocurrents, produced in such cells were comparatively small in many cases, and it is an object of the present invention to increase the photosensitivity, especially the photocurrents.

According to the invention, simultaneously with the diffusion of the acceptor impurity the zone is subjected to the action of at least one of the elements of the sixth group of the periodic system which have an atomic number not exceeding 16, that is to say, sulphur and/or oxygen. It has bee found that the possibility of the formation of sulphides or oxides of the acceptor impurity diffused into the layer does not prevent the formation of a barrier layer in the cadmium sulphide. Furthermore, the spectral sensitivity of a photocell manufactured by this method proves that the sensitivity is not due to a junction between the cadmium sulphide and an oxide or sulphide of the acceptor.

A sulphide and/or oxide of the acceptor impurity may be provided on the surface before the diffusion treatment. Sulphur, however, is preferably provided in the elemental state, a layer of sulphur preferably being applied before the acceptor material is provided.

In order to use the effect produced by oxygen, a gas containing oxygen, for example, air or pure oxygen, is preferably used in the diffusion treatment. In this method, the acceptor material is preferably applied in the form of a porous layer, for example, by electrodeposition. In such a process, porous layers are usually obtained by the use of high current densities.

In our prior copending patent application Serial No. 209,688, filed July 13, 1962, it has been suggested, in order to diffuse an impurity into a zone of a cadmium sulphide body adjoining the surface, to coat the relevant portion of the surface with a layer of the material to be diffused and to heat this zone by blowing a hot gas stream onto said surface portion. This method can advantageously be combined with the method according to the present invention, because thus the heat treatment can be restricted to the surface coated with the layer of acceptor material and the cold areas are little or not influenced by sulphur or oxygen. To obtin the effect produced by oxygen, a gas which contains oxygen is preferably used in the blowing process.

The acceptor impurity used preferably consists of copper or silver.

In order that the invention may readily be carried into effect, embodiments thereof will now be described, by way of example, with reference to the accompanying diagrammatic drawing, in which.

*Example I*

Figure 1:
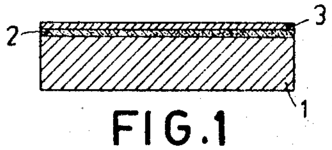
FIG. 1 is a part cross-section, part front elevation of a stage of the manufacture of a photocell which includes a cadmium sulphide single crystal.

Manufacture starts from a single crystal wafer 1 of n-type cadmium sulphide having a diameter of 5 mms. and a thickness of 1 mm., which was obtained by cutting from a cadmium sulphide single crystal produced by sublimation and doped with indium and chlorine, the surfaces of the resulting wafer having been polished (FIG. 1). The specific resistivity of the cadmium sulphide was about 1Ω cm. Ine side of the wafer 1 is coated by deposition from the vapour phase with a thin layer of sulphur 2, having a thickness of less than 1 micron after which the sulphur layer 2 is coated, likewise by deposition from the vapour phase, with a layer of copper 3, having a thickness of less than 1 micron, the thickness of the sulphur and copper layers being not critical.

Figure 2:
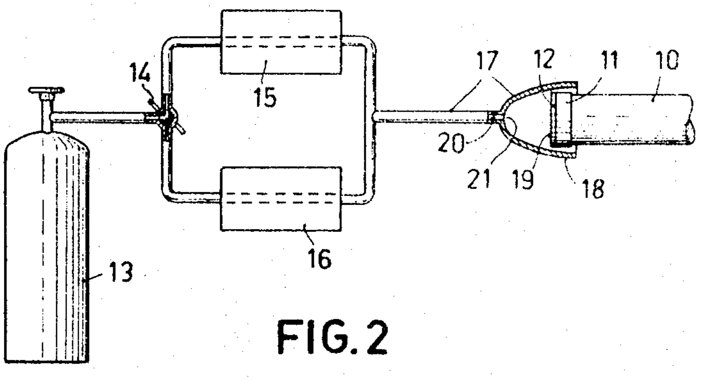
FIG. 2 is a front elevation of an arrangement for blowing hot or cold gas onto a surface.

The wafer shown in FIG. 1 which has been provided with the said layer is subjected to a tempering treatment with the aid of the blowing arrangement shown in FIG. 2. For this purpose, the cadmium sulphide wafer 11 is arranged with the side opposite to that coated with layers 12 on a support 10 of high thermal conductivity. The arrangement includes a vessel 13, which contains argon gas under pressure. From this vessel 13, the inert gas can be supplied by means of a three-way valve 14 either through the chamber 15, which is a resistance furnace heated to 1000° C., or through the chamber 16, which a vessel cooled by liquid air, to the nozzle 17. The nozzle 17 has a cup-shaped end 18 which prevents ambient air from being drawn towards the surface 19 to be treated of the coated cadmium sulphide wafer, and prevents the gas jet from being inconveniently cooled on issuing from the thin pipe 20. The support 10 is disposed so that the surface portion 19 to be treated is completely surrounded by the cup-shaped end 18. At a given setting of the three-way valve 14, argon gas is blown through the hot chamber 15 and the nozzle 17 onto the surface 19. The gas which strikes the surface 19 has a temperature of about 650° C. As a result, the elemental sulphur is partly incorporated in a surface layer of the cadmium sulphide and partly evaporated while part of the acceptor copper diffuses into a thin zone adjoining the surface of the wafer. After 15 seconds, the three-way valve 14 is adjusted so that the argon gas flows through the cooled chamber 16 with the result that the heated portions of the wafer are rapidly cooled by cold gas blown onto the surface 12. After this treatment, the sulphur layer 2 (FIG. 1) has completely disappeared and the copper layer 3 is in direct contact with the cadmium sulphide.

Figure 3:
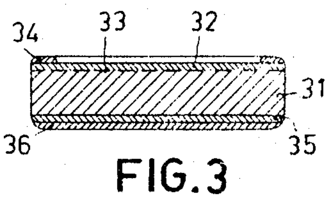
FIG. 3 is a part sectional view, part front elevation of a finished photocell which includes a cadmium sulphide crystal.

By covering an annular marginal layer with paraffin wax and immersing the wafer in an aqueous solution of KCN and $H_2O_2$, in the manner described in copending patent application, Serial No. 269,420, filed April 1, 1963, the copper layer is removed except for the covered annular marginal portion; after which the paraffin wax is dissolved. Thus, there is produced in the cadmium sulphide wafter 31 a thin zone 32 which is doped with the acceptor copper and together with the underlying unchanged n-type material forms a barrier layer which is indicated by the broken line 33 (FIG. 3). An annular electrode 34 made from the remainder of the original copper layer lies on said thin zone. On the side of the wafer more remote from the zone 32, a thin layer of zinc 35 and subsequently a layer of copper 36 are deposited from the vapour phase, the said two layers together forming a second electrode. The electrodes are then provided each with a current lead of, for example, nickel (not shown) by means of silver paste. Thus, a barrier layer photocell is obtained which on illumination of the side provided with the electrode 34 by sunlight exhibits a short circuit current of about 10 ma./cm.$^2$.

*Example II*

One side of a single crystal wafer of n-type cadmium sulphide of the kind described in Example I is coated with a porous layer of copper by electrodeposition with the use of a 10% solution of copper sulphate and current density values of 100 ma./cm.$^2$. The wafer provided with the porous layer of copper is subjected in a manner similar to that described in Example I to a temperature treatment by means of the arrangement shown in FIG. 2, however, the vessel 13 contains compressed oxygen instead of argon. A zone which is doped with copper was again formed, but instead of sulphur, oxygen was incorporated in the cadmium sulphide of the thin zone. The partly oxidized copper zone is completely removed and an annular electrode of gold is provided by deposition from the vapour phase with the use of a suitable mask. Otherwise, the process was similar to that described in Example I without, however, the application of sulphur.

In this manner, a barrier-layer photocell was manufactured which on illumination of the side including the thin copper-doped zone exhibits a short-circuit current of about 10 ma./cm.$^2$.

When a barrier-layer photocell is made in a manner similar to that described in Example I, without using a layer of sulphur, but with blowing on of argon gas, a barrier-layer photocell is obtained which on illumination with sunlight exhibits a short-circuit current of about 8 ma./cm.$^2$.

*Example III*

In a manner similar to that described in Example I, a barrier-layer photocell was made, however, instead of the layer of copper 3, a layer of silver was deposited from the vapour phase, and argon gas at a temperature of 650° C. was blown onto the wafer for 150 seconds instead of 15 seconds. On exposure to sunlight, the resulting barrier-layer photocell exhibits a short-circuit current of more than 1 ma., whereas a photocell manufactured in a similar manner, but without the use of a layer of sulphur, on exposure to sunlight exhibits a short-circuit current of only 0.5 ma.

*Example IV*

A barrier-layer photocell is manufactured in a manner similar to that described in Example II, however, instead of a copper-sulphate solution, an electrolytic silver bath and substantially similar current density values were used to produce a porous silver layer. The temperature treatment was similar to that described in Example III, but instead of argon gas, air was blown onto the wafer. The resulting barrier-layer photocell exhibits a short-circuit current of more than 1 ma. on exposure to sunlight.

*Example V*

A vitreous-quartz plate 41 (FIGS. 4 and 5), the upper surface of which was roughened by sandblasting and degreased, was provided with the aid of a suitable mask with a thin layer of gold 42 of length 14 mms. and width 9 mms. by deposition from the vapor phase. With the aid of another mask, the layer of gold was provided with a layer of cadmium sulphide 43 of length and width 10 mms. and of thickness about 10 microns, which extends beyond the gold layer on three sides. A portion 44 of the gold layer adjoining the cadmium sulphide layer 43 remains uncovered. The deposition of the cadmium sulphide layer from the vapor phase was performed in a vacuum, pure cadmium sulphide being vaporized while the vitreous-quartz plate was heated on a heating block to a temperature of from 150° C. to 200° C. The deposited cadmium sulphide has n-type conductivity.

Figure 4:
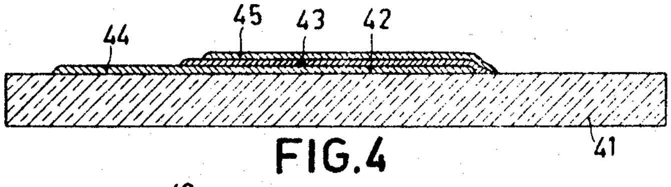
FIG. 4 is a sectional view of a stage of the manufacture of a photocell which includes a cadmium sulphide layer.
Figure 5:
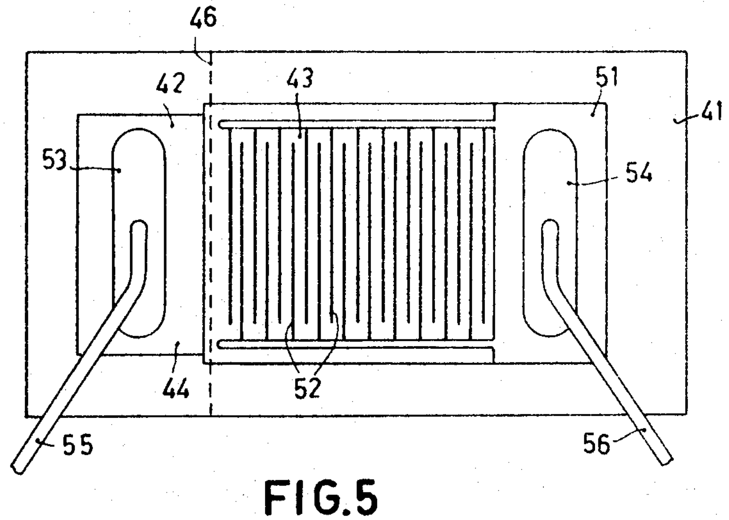
FIG. 5 is a plan view of a finished photocell which includes a cadmium sulphide layer.

The cadmium sulphide layer 43 is then coated with a porous layer of copper 45. Current may be supplied by way of the layer of gold. The uncovered gold layer 44 is protected against the electrolytic bath by a layer of paraffin wax which extends up to the broken line 46 (FIG. 5). The bath for the electrodesposition process preferably consists of an aqueous 10% solution of copper sulphate while current densities of from 100 to 150 ma./cm.$^2$ are used. The resulting copper layer has a thickness of from 1 to 2 microns. After the assembly has been washed and the layer of paraffin wax has been removed by means of a suitable solvent, the stage shown in FIG. 4 is obtained. The vitreous-quartz plate provided with the layers is then arranged in a blowing arrangement similar to that shown in FIG. 2 and in a manner similar to that described in Example II oxygen heated to 650° C. is blown onto the plate for 15 seconds and subsequently cooled oxygen for 15 seconds. The acceptor copper diffuses into a thin superficial zone and simultaneously oxygen from the gas is incorporated in the cadmium sulphide of said zone.

In the manner described in the copending patent application, Serial No. 269,420, the uncovered gold layer 44 is coated with paraffin wax and then the partly oxidized copper layer is removed with the aid of an aqueous solution of $H_2O_2$ and KCN, after which the paraffin wax is removed. By means of a suitable mask an electrode raster 52 of gold in the form of a double comb is provided on the cadmium sulphide surface and an adjoining layer of gold 51 is provided on the free surface of the vitreous-quartz plate by deposition from vapor. Finally, nickel wires 55 and 56 are secured with the aid of silver paste 53 and 54 to the uncovered portion 44 of the gold layer 42 and to the gold layer 51, respectively.

The resulting barrier-layer photocell shown in FIG. 5 on exposure to sunlight exhibits a no-load voltage of 0.5 v. and a short-circuit current of 6 ma./cm.$^2$.

A similar behaviour is shown by a photocell which is manufactured in a similar manner except that an additional layer of sulphur is interposed between the cadmium sulphide layer 43 and the copper layer 45, the tempering treatment being performed by blowing argon gas onto the cell.

If, however, during manufacture no oxygen or sulphur was used, a barrier-layer photocell was obtained which exhibited a short-circuit current of less than 0.01 ma. and a no-load voltage of only about 0.05 v.

What is claimed is:

1. A method of making a barrier-layer semiconductor device comprising providing a cadmium sulphide semiconductive body, providing on a surface portion of said body of n-type conductivity a layer of an acceptor impurity, providing a source of oxygen-containing gas and heating means and cooling means for the gas, directing a stream of oxygen-containing gas from the source through the heating means and blowing the resultant heated gas onto the surface portion of the semiconductive body containing the acceptor impurity to diffuse the said impurity into the said surface portion of the body in the presence of the oxygen to alter an electrical property thereof, and thereafter directing the stream of oxygen-containing gas through the cooling means and blowing the resultant cooled gas onto the same said surface portion of the body to rapidly cool same and preserve the altered electrical property.

2. A method as set forth in claim 1 wherein the layer of the acceptor impurity is porous.

3. A method as set forth in claim 1 wherein the acceptor is selected from the group consisting of copper and silver.

4. A method of making a barrier-layer semiconductor device comprising providing a cadmium sulphide semiconductive body, providing on a surface portion of said body of n-type conductivity a layer of sulphur and on the latter a layer of an acceptor impurity, providing a source of gas and heating means and cooling means for the gas, directing a stream of the gas from the source through the heating means and blowing the resultant heated gas onto the surface portion of the semiconductive body containing the acceptor impurity and the sulphur to diffuse the said impurity into the said surface portion of the body in the presence of the sulphur to alter an electrical property thereof, and thereafter directing the stream of gas through the cooling means and blowing the resultant cooled gas onto the same said surface portion of the body to rapidly cool same and preserve the altered electrical property.

5. A method as set forth in claim 4 wherein the impurity is selected from the group consisting of copper and silver.

References Cited by the Examiner

UNITED STATES PATENTS

| | | | |
|---|---|---|---|
| 2,780,569 | 2/1957 | Hewlett | 148—186 |
| 2,802,760 | 8/1957 | Derick | 148—189 |
| 2,820,841 | 1/1958 | Carlson | 148—186 |
| 2,845,894 | 8/1958 | McIlvaine | 148—186 |
| 2,879,190 | 3/1959 | Logan | 148—189 |
| 2,930,722 | 3/1960 | Ligenza | 148—189 |
| 2,956,913 | 10/1960 | Mack | 148—189 |
| 3,096,209 | 7/1963 | Inghram | 75—175 |

OTHER REFERENCES

Metals Handbook, 1948 ed., American Society for Metals, Cleveland, Ohio, p. 1166.

HYLAND BIZOT, *Primary Examiner.*

DAVID L. RECK, H. W. CUMMINGS, *Examiners.*